Nov. 27, 1934.　　　　I. G. RIES ET AL　　　　1,982,322
APPARATUS FOR MAKING MOTION PICTURES
Filed April 30, 1923　　　2 Sheets-Sheet 1
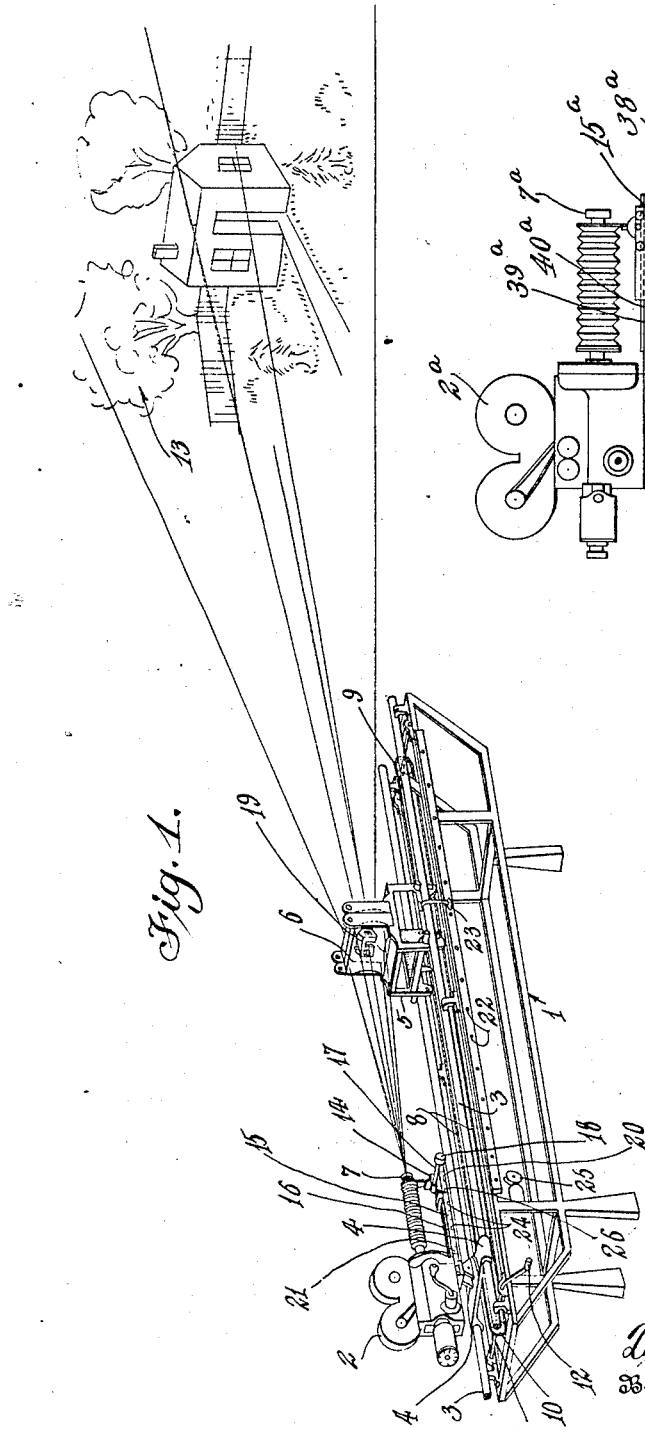
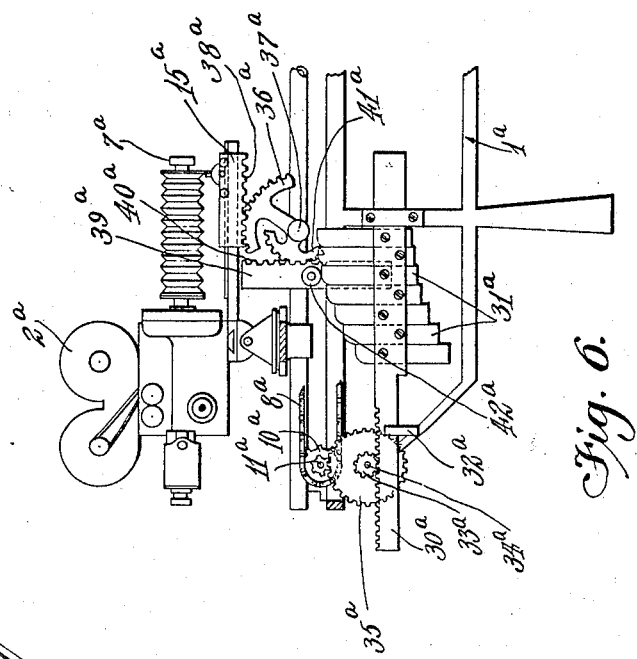
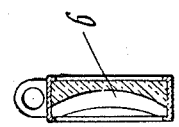
Inventors
Irving G. Ries
Douglas Graham Shearer
By Lyon & Lyon
Attorneys Nov. 27, 1934.   I. G. RIES ET AL   1,982,322
APPARATUS FOR MAKING MOTION PICTURES
Filed April 30, 1923   2 Sheets-Sheet 2
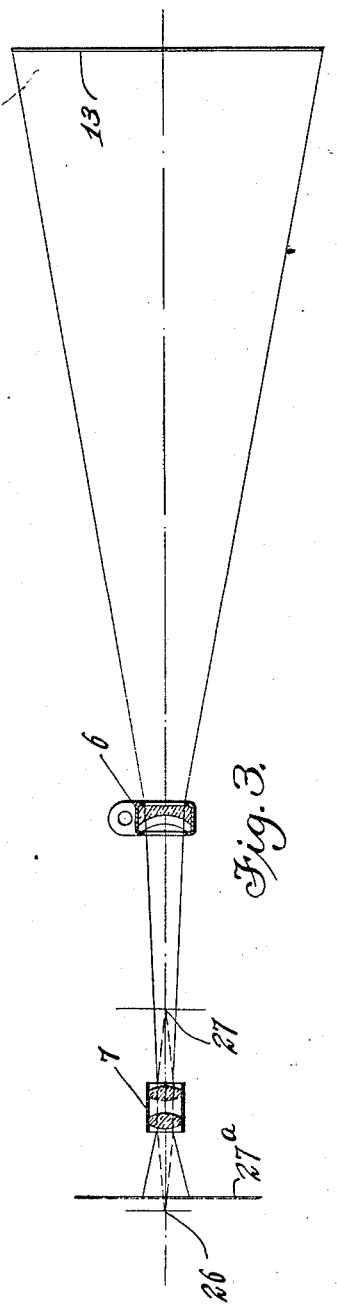
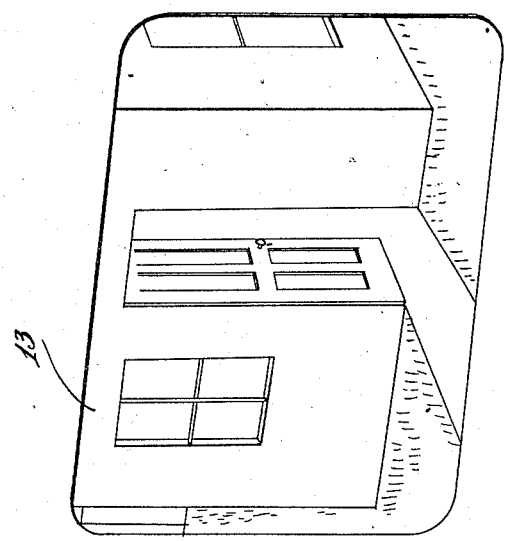
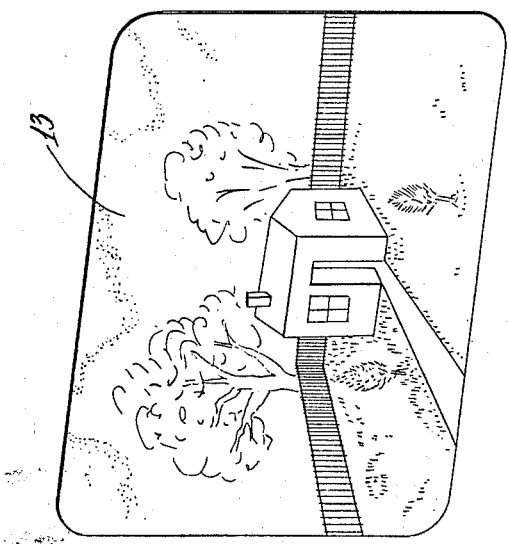

Patented Nov. 27, 1934

1,982,322

UNITED STATES PATENT OFFICE 1,982,322

APPARATUS FOR MAKING MOTION PICTURES

Irving G. Ries and Douglas Graham Shearer, Los Angeles, Calif., assignors to Metro-Goldwyn-Mayer Corporation, Culver City, Calif., a corporation of New York Application April 30, 1928, Serial No. 273,841

7 Claims. (Cl. 95—45)

This invention relates to an apparatus for making motion pictures and particularly suited for obtaining a "close shot" of an object or scene, or a "long shot" of an object or scene without moving the motion picture camera closer to the object or scene, or farther from the object or scene, and is also directed to an apparatus for making a perambulator shot up to, or a perambulator shot away from an object or scene, or a combination of both, while maintaining the motion picture camera stationary.

Heretofore it has been common practice to take what is known in the art as "perambulated shots" of a scene or object by sliding or rolling a camera away from or toward the object or scene to be photographed. The perambulating of the camera to or from the object or scene is often an impossible or objectionable method of making such scenes due to physical difficulties encountered, and the inability to accurately slide or roll the camera to a predetermined position toward or away from the object being photographed and due to the fact that in many cases there are physical obstructions present which prevent the moving of the camera closer to or away from the object being photographed, such obstructions as commonly encountered are possibly a body of water, a deep ravine, a glass partition, or a lattice fence between the camera and the object or scene being photographed.

An object of this invention is to provide an apparatus for producing what are commonly known as "perambulated shots" by maintaining the camera stationary in relation to the scene or object to be taken and includes a lens, or lenses, in front of the motion picture camera movable in a manner to enlarge or diminish the image of the scene or object which is reproduced on the film in the camera.

Another object of this invention is to provide an apparatus for carrying out the objects of this invention which includes a motion picture camera, a lens, a carriage for the lens, and means for manipulating the lens in proper position in relation to the camera, in a manner to maintain the illumination or brightness of the image produced in the camera at a sufficient or predetermined amount.

Other objects and advantages of this invention it is believed will be apparent from the following detailed description of a preferred embodiment thereof as illustrated in the following drawings:

In the drawings:

Figure 1 is a perspective view illustrating the method and apparatus embodying this invention.

Figure 2 is a sectional edge elevation of a lens as embodied in this invention.

Figure 3 is a diagrammatic view of the apparatus embodying this invention illustrating diagrammatically the manner of carrying out the method embodying this invention to maintain sufficient illumination or brightness of the image reproduced in the camera.

Figure 4 is a view showing a scene.

Figure 5 is a view showing a "close-up" of a portion of the scene shown in Figure 4.

Figure 6 is an enlarged fragmental elevation of a modified form of apparatus embodied in this invention.

In using the apparatus of this invention, a stationary camera is positioned in operative relation with respect to the scene to be taken. Between the camera and the scene there is mounted a large negative or auxiliary lens, or lenses, having comparatively low negative power. This auxiliary lens is moved toward, or away from, the scene, in front of the objective lens of the camera, in such a manner that the image of the scene appears through the auxiliary lens, and increases or decreases in size as the auxiliary lens is moved away from and toward the scene. The illumination or brightness of the image produced in the camera is not reduced or lessened or increased by the manipulation of the auxiliary lens beyond a sufficiently small amount to make it practical to use this method in photographing, to produce perambulating scenes which are normally illuminated, or interior artificially illuminated scenes, or night scenes, without using excessive illuminating means or varying the illumination on the scenes as the size of the image to be produced on the film in the camera is increased or decreased. The auxiliary lens is manipulated to and fro beyond the principal focal point of the objective lens of the camera and therefore remains purely an auxiliary or reducing lens and does not form what is commonly known as a telephoto combination when taken together with the objective lens of the camera in an optical sense. It is the manipulation of the auxiliary or reducing lens beyond the principal focal point of the objective lens of the camera which enables us to produce perambulator scenes without cutting down the effective light below the illumination indicated by the diaphragm stop of the objective lens 7 if used alone for any size image produced of a given scene being photographed, within the limits of the apparatus.

By employing the large auxiliary lens and manipulating the same beyond the principal focal point of the objective lens of the camera, the focal length of the complete combination is decreased, and the effective aperture of the complete combination, or the illumination on the film, is greater than that of the main objective. It has also been found that the farther from the main objective lens the auxiliary lens is placed, the shorter is the focal length of the complete combination and the larger is the effective aperture, and the greater the illumination on the film. It will, therefore, be obvious that by manipulating the reducing or auxiliary lens back and forth to any position beyond the principal focal point of the main objective lens, that the focal length of the complete combination is varied accordingly and that the size of the picture on the film is varied accordingly, while the effective aperture of the complete combination remains at least as large as that of the main objective lens and the further the reducing lens is moved from the objective lens, the greater will be the effective aperture of the combination.

In the accompanying drawings are illustrated a preferred form of apparatus in which 1 indicates a supporting frame upon which an ordinary motion picture camera 2 is mounted on guides 3 as illustrated at 4.

Slidably mounted on the guides 3 is a carriage 5 which carries the large auxiliary lens combination 6. The lens combination 6 may be a single large minus lens of low negative power, as illustrated in Figure 2, or may be a pair of such minus lenses mounted together on the carriage 5.

In order to manipulate the lens 6 back and forth from the principal or objective lens 7 of the camera 2, the following means are preferably provided. Secured to the carriage 5 is a chain 8 which is trained over an idler sprocket 9 at one end and over a driven sprocket 10 at the reverse end of the frame 1. The sprocket 10 is secured to a shaft 11 and a handle 12 is provided for rotating the shaft 11. In order to maintain the lens combination of the lenses 6 and 7 in proper focus upon the scene 13, the objective lens 7 of the camera 2 is mounted on a slide 14 which is slidably supported on a guide 15. A gear rack 16 is mounted in the guide 15 and a pinion is rotatably supported in the slide 14. The pinion (not shown) is secured to an operating shaft 17, having a handle 18 secured thereto. By rotating the shaft 17, the objective lens 7 is moved to or from the camera 2. In maintaining the proper focus of the lens combination, the lens 7 is prefocused on the image 19 of the scene 13 which appears in the reducing lens 6.

As the reducing lens 6 is moved away from or toward the lens 7, the lens combination would become out of focus and means are therefore provided for shifting the lens 7 in order to maintain the focus of this lens 7 on the image 19 appearing through the lens 6. After the lens 7 has been prefocused, a mark 20 is made on a strip 21 secured to the guide 15 opposite pointer 26 on slide 14 to indicate the proper position of the lens 7 when the lens 6 is positioned as indicated in Figure 1.

A plurality of spaced contact points 22 are formed along the frame 1 and as the lens 6 is shifted so that the contact bar 23 engages each one of the contacts 22, the lens 7 is also shifted and marks 24 are made on the strip 21 to correspond with the proper positions of the lens 7 to focus the lens 7 on the image 19 through the lens 6 as the lens 6 is moved so that the different contacts 22 engage the contact bar 23. Each of the contacts 22 is connected with a signaling device, for example, an electric bell and the contact bar 23 is connected with the opposite side of the electric circuit to the bell. In this manner when the contact bar 23 engages a contact 22, a signal is given and the camera man will at this time move the lens 7 of the camera 2 to the position corresponding to the mark previously made which corresponds to the contact 22 which is engaged with the contact bar 23. The bell is illustrated at 25. It is to be understood that the movement of the lens 7 of the camera is not directly proportional to the movement of the lens 6. In other words, the movement of the lens 7 should not be in a straight line relationship to the movement of the lens 6. The stops 22 merely signal the operator when to adjust the lens 7 but if the stops 22 are equally spaced and the carriage 5 advanced at a uniform speed, the lens 7 is not moved equal distances at each signal. It may be stated that a progressively varying movement of relationship should exist between lenses 6 and 7, this progressive movement of changing ratio varying with the focal length and curvature of the lens 6, thus maintaining the objective or camera lens 7 upon the image of the scene to be photographed formed by the negative lens 6.

In Figure 5 is illustrated the image of the scene 13 which will be formed when the auxiliary lens 6 is moved to a position near the lens 7 while in Fig. 4 is illustrated the image of the scene 13 which will appear on the film in the camera 2 when the auxiliary lens 6 is moved away from the lens 7 and it will be obvious that images of increasing or decreasing size of the scene 13 will be formed as the lens 6 is moved to or from the camera 2 between the limits as illustrated in Figures 4 and 5.

In focusing the combination the lens 7 is moved to a position so that its principal focal point 26 is beyond the film 27ᵃ in the camera 2 as illustrated in Fig. 3, and the auxiliary or reducing lens 6 is at all times manipulated outside of or beyond the opposite principal focal point 27 of the objective lens 7. It will be obvious that by moving the lens 6 toward the scene 13 that the lens 7 will gather in light from a greater area and this increased light intensity will increase the brilliancy or illumination of the image formed by the lens 7. As the lens 6 is moved toward the camera 2 so that a larger image of a portion of the scene 13 is formed by the lens 7, it will be obvious that although the lens 7 will gather light from a lesser area or portion of the scene 13, the larger image will still be of sufficient brilliancy for photographic purposes, if the aperture of lens 7 has been suitably adjusted, because the effective aperture of the complete combination will not be less than the aperture indicated on lens 7, thereby producing images of increasing or decreasing size of sufficient light intensity at all positions, eliminating the necessity of increasing beyond usual practice the illumination projected onto the scene 13.

In the modified form of this invention illustrated in Figure 6, the objective lens 7ᵃ of the camera 2ᵃ is connected with the auxiliary lens 6 so that as the auxiliary lens 6 is manipulated between the scene 13 and the principal focal point of the camera 2ᵃ the objective lens 7ᵃ is automatically shifted to the proper position to maintain the lens 7ᵃ in focus upon the image of the scene formed on the lens 6. In order to accomplish this object, there is provided a rack 30ª which carries a number of adjustable bars 31ª. The rack 30ª is supported in bars 32ª secured to the frame 1ª. A pinion 33ª meshes with the gear teeth of the rack 30ª and is secured to a shaft 34ª upon which a gear 35ª is mounted. The gear 35ª meshes with a gear mounted upon the shaft 11ª to which the sprocket 10ª which drives the chain 8ª is secured. A gear segment 36ª is pivotally supported at 37ª in position to engage the gear teeth 38ª formed on the under side of the slide 15ª. A sliding bar 39ª is mounted to slide vertically relative to the frame 1ª and is provided with gear teeth 40ª which mesh with the teeth of a gear segment 41ª which is operatively connected with the segment 36ª. As the shaft 11ª is rotated to move the chain 8ª and thereby shift the lens 6, the rack 30ª is driven to shift the positions of the bars 31ª.

As the bars 31ª are moved they engage a roller 42ª secured to the bar 39ª and shift the bar 39ª vertically, thereby causing the segments 41ª and 36ª to rotate and drive the slide 15ª shifting the lens 7ª to maintain the same in focus with the image formed upon the lens 6. In operation the lens 7ª is prefocused upon the image appearing in the lens 6 and the carriage 5 is moved along the guides 3 within the range desired. During operation the contact bar 23 engages the contacts 22, and roller 42ª carried by the bar 39ª contacts with bars 31ª thereby raising or lowering the bar 39ª and consequently shifting the lens 7ª to adjust the focus of this lens on the image appearing in the reducing or auxiliary lens 6. The bars 31ª thus in effect produce a cam surface which imparts a progressively varying movement to the lens 7ª with respect to a uniform movement of the negative lens 6. Furthermore, such varying movement is itself automatically attained without the necessity of manual adjustment to either of the lenses. If the sprocket 8ª is driven at a uniform speed, the bars 31ª, roller 42ª, member 39ª, as well as the gear segments 41ª and 38ª, translate such uniform motion of the negative lens 6 into a progressively varying motion of the camera lens 7ª.

Having fully described our invention, it is to be understood that we do not wish to be limited to the details herein set forth, but our invention is of the scope of the appended claims.

We claim:

1. In a photographic apparatus of the character described, the combination of a camera provided with an objective lens movable along its optical axis, a negative lens movably positioned in the optical axis, and means for simultaneously imparting a uniform motion along the optical axis to one of said lenses and progressively varying motion along the optical axis to the other of said lenses and means for changing the progressively varying motion of the last mentioned lens.

2. In a photographic apparatus of the character described, the combination of a camera provided with an objective lens movable along its optical axis, a negative lens movably positioned in the optical axis, means for moving said negative lens, and means actuated by said moving means for moving said objective lens at a progressively changing rate with respect to the movement of said negative lens said last named means being provided with means for altering the progressively changing rate of movement of said objective lens.

3. In a photographic apparatus of the character described, the combination of a camera provided with an objective lens movable along its optical axis, a negative lens movably positioned in the optical axis, means for moving said negative lens along said optical axis, means actuated by said moving means for moving said objective lens at a progressively changing rate with respect to the movement of said negative lens, and means for adjustably regulating said last named means to vary such progressive rate of change.

4. In a photographic apparatus of the character described, the combination of a bed frame, a camera provided with an objective lens movable along its optical axis carried by said frame, a carriage slidably carried on said bed frame, a negative lens positioned on said carriage, means for moving the carriage along said bed frame, a plurality of spaced contact points carried by said bed frame, a signalling device operably connected to said contact points, and a contact point operably connected to said carriage adapted to cooperate with contact points carried by said frame to actuate said signalling means.

5. In a photographic apparatus of the character described, the combination of a bed frame, a camera provided with an objective lens movable along its optical axis carried by said bed frame, a carriage slidably mounted on said bed frame, a negative lens positioned on said carriage in the optical axis of said objective, means for moving the carriage and negative lens along the optical axis of said objective, means for moving said objective lens, and a variably adjustable means operably connected to said moving means for translating a substantially uniform movement of one of said moving means into a progressively varying movement of the other of said moving means.

6. In a photographic apparatus of the character described, the combination of a bed frame, a camera provided with an objective lens movable along its optical axis carried by said bed frame, a carriage provided with a negative lens slidably positioned on said bed frame, means for moving said objective lens and carriage toward and away from each other, and a selectively adjustable means for translating uniform rate of movement of said carriage into a progressively changing rate of movement of said objective lens.

7. In a photographic apparatus of the character described, the combination of a bed frame, a camera provided with an objective lens movable along its optical axis carried by said bed frame, a carriage provided with a negative lens slidably positioned on said bed frame, means for moving said objective lens and carriage toward and away from each other, and means for translating uniform rate of movement of said carriage into a progressively changing rate of movement of said objective lens, said translating means including means for adjustably regulating the rate of progressive change.

IRVING G. RIES.
DOUGLAS GRAHAM SHEARER.